United States Patent [19]
Kanda

[11] Patent Number: 5,730,459
[45] Date of Patent: Mar. 24, 1998

[54] AIRBAG SYSTEM

[75] Inventor: Minoru Kanda, Wako, Japan

[73] Assignee: Honda Giken Kogyo Kabushiki Kaisha, Tokyo, Japan

[21] Appl. No.: 633,063

[22] Filed: Apr. 16, 1996

[30] Foreign Application Priority Data

Apr. 20, 1995 [JP] Japan ................................. 7-095523

[51] Int. Cl.$^6$ ................................................. B60R 21/16
[52] U.S. Cl. ................................. 280/731; 280/728.2
[58] Field of Search .......................... 280/728.2, 731, 280/732

[56] References Cited

U.S. PATENT DOCUMENTS 5,383,682 1/1995 Nagata et al. .................... 280/731

*Primary Examiner*—Kenneth R. Rice
*Attorney, Agent, or Firm*—Armstrong, Westerman, Hattori, McLeland, & Naughton

[57] ABSTRACT

An airbag module is provided at a central portion of a steering wheel, and includes an inflator, an airbag and a front steering cover. A steering boss having an arm is secured to a steering shaft. A side wall of the front steering cover is supported by the arm through an energy-absorbing support arrangement. When the developing airbag contacts with an occupant in a vehicle and a reaction force from the occupant is applied to the airbag module, the support arrangement is caused to plastically deform to move the airbag module in a direction opposite from the developing direction of the airbag. With this arrangement, when the airbag develops and holds the occupant, it is possible to hold him or her as soft as possible.

2 Claims, 7 Drawing Sheets

AIRBAG SYSTEM

BACKGROUND OF THE INVENTION

1. Field of the Invention

The present invention relates to an airbag system comprising an airbag module provided at a central portion of a steering wheel and including an airbag and an inflator for supplying a high pressure gas to the airbag, the airbag being developed, when a deceleration greater than a predetermined value is detected, into a passenger compartment by the high pressure gas generated by the inflator for holding an occupant in a vehicle.

2. Description of the Related Art

In an airbag system for a motor vehicle, when the airbag develops into the passenger compartment by a high pressure gas, it is desirable to hold an occupant as softly as possible. In a conventional airbag system, the airbag is formed with a gas vent hole for discharging the gas from the airbag. When an internal pressure in the airbag is increased by the contact with the occupant, the gas is discharged from the gas vent hole to reduce the internal pressure so as to hold the occupant softly.

SUMMARY OF THE INVENTION

It is an object of the present invention to provide an airbag system which can hold the occupant more softly than the conventional airbag system even if the airbag develops within a close range from the occupant.

To achieve the above object, according to a first feature of the invention, there is provided an airbag system comprising an airbag module provided at a central portion of a steering wheel and including an airbag and an inflator for supplying a high pressure gas to the airbag, the airbag being developed, when a deceleration greater than a predetermined value is detected, into a passenger compartment by the high pressure gas generated by the inflator for holding an occupant in a vehicle, wherein the airbag module is movably supported, through an energy absorbing connection means, by a steering boss secured to a steering shaft so as to move the airbag module in an opposite direction from a developing direction of the airbag to absorb energy of a secondary collision.

With the first feature, when the airbag develops by the high pressure gas generated by the inflator to hold the occupant, the airbag module is moved with respect to the steering boss by a load applied from the occupant to the airbag. At that time, energy of a secondary collision is absorbed by the energy-absorbing connection means provided between the steering boss and the airbag module so that the airbag can hold the occupant softly.

According to a second feature, in addition to the first feature, the energy absorbing connection means is a deformable connection member, which connects the steering boss and the airbag module.

With the second feature, when the airbag module moves with respect to the steering boss, the connection member, which connects the steering boss and the airbag module with each other, is deformed so that energy of the secondary collision is absorbed.

According to a third feature, in addition to the first feature, the energy absorbing connection means comprises an elongated hole formed in at least one of the steering boss and the airbag module, and a fastening means passing through the elongated hole to fasten the steering boss and the airbag module with a predetermined frictional resistance.

With the third feature, when the airbag module moves with respect to the steering boss, energy of the secondary collision is absorbed by a frictional resistance which is applied between the steering boss and the airbag module fastened to each other by the elongated hole and the fastening means.

According to a fourth feature, in addition to the first feature, the energy absorbing connection means comprises an elongated hole formed in at least one of the steering boss and the airbag module, and a guide means passing through the elongated hole for guiding the airbag module for movement with respect to the steering bass, the elongated hole having a narrow portion smaller than a diameter of the guide means.

With the fourth feature, when the airbag module moves with respect to the steering boss, energy of the secondary collision is absorbed by a deformation of the narrow portion of the elongated hole caused when the guide means passes through the narrow portion.

According to a fifth feature, in addition to the first feature, the energy absorbing connection means comprises a front steering cover provided in front of the airbag module, and a deformable rear steering cover secured to the steering boss and abutting against a back surface of the front steering cover.

With the fifth feature, when the airbag module moves with respect to the steering boss, the rear steering cover secured to the steering boss is pushed by the front steering cover of the airbag module and deformed, and energy of the secondary collision is absorbed by such a deformation.

The above and other objects, features and advantages of the invention will become apparent from the following description of preferred embodiments taken in conjunction with the accompanying drawings.

DESCRIPTION OF THE PREFERRED EMBODIMENTS

The present invention will now be described by way of preferred embodiments of the invention taken in conjunction with the accompanying drawings.

Figure 1:
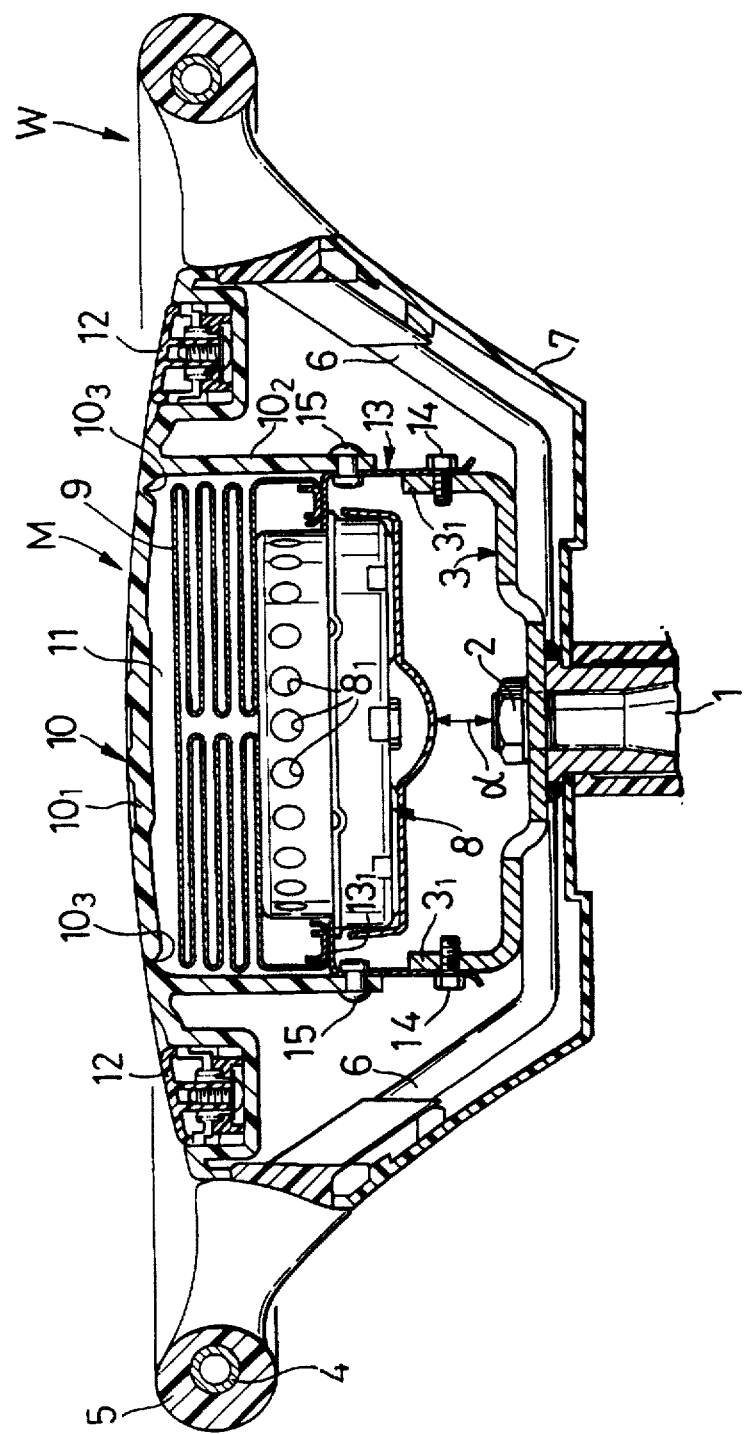
FIG. 1 is a sectional view of an airbag system according to a first embodiment of the present invention.

As shown in FIG. 1, a steering wheel W of a motor vehicle includes a steering boss 3 relatively non-rotatably fitted to a rear end of a steering shaft 1 and secured by a nut 2. An annular wheel rim 5 is disposed such as to surround the steering boss 3 and has a core material 4 embedded therein. Left and right spokes 6 (of which two are provided) extend radially from the steering boss 3, and a rear steering cover 7 covers the back sides of the spokes 6.

An airbag module M is mounted at a central portion of the steering wheel W. The airbag module M includes an inflator 8 comprising a vessel in which a propellant for generating a high pressure gas is charged, an airbag 9 received in its folded-up deflated state in front of the inflator 8, and a front steering cover 10 fitted to a front opening of the rear steering cover 7. The front steering cover 10 includes a front wall $10_1$ and side walls $10_2$. A space for receiving the airbag 9 is defined by the front wall $10_1$, the side walls $10_2$ and the inflator 8. The front wall $10_1$ of the front steering cover 10 is formed with thin frangible portions $10_3$ which break-away or tear-away when the airbag 9 develops. Switches 12 and 12 for a horn are mounted at radially outer sides of the side wall $10_2$, respectively.

A plurality of arms $3_1$ are formed by bending peripheral portions of the steering boss 3 upwardly. The arms $3_1$ and ends of the side walls $10_2$ of the front steering cover 10 are mutually opposed and coupled to each other through angularly disposed connection members 13 made of thin metal plate. More specifically, the connection members 13 and the arms $3_1$ of the steering boss 3 are coupled to each other by means of plurality, of bolts 14, and the connection members 13 and the ends of the side walls $10_2$ of the front steering cover 10 are coupled to each other by means of a plurality of rivets 15.

One end of each of the connection members 13 is bent radially inwardly to constitute a flange $13_1$. An outer peripheral portion of the inflator 8 and an opening of the airbag 9 are secured to the flanges $13_1$. In such a state, a clearance a is provided between the inflator 8 and the steering shaft 1 for permitting a movement of the airbag module M when the airbag 9 develops.

The operation of the first embodiment of the present invention will now be described.

If a deceleration sensor (not shown) detects a deceleration greater than a predetermined value, as may be caused by a collision of the vehicle, the propellant in the inflator 8 ignites and burns, and a high pressure gas is generated and supplied from gas ejection holes $8_1$ into the interior of the folded-up deflated airbag 9. When the airbag 9 is inflated by the pressure of the high pressure gas, the thin portions $10_3$ of the front steering cover 10 break-away for providing an opening, and the airbag 9 develops from such opening into the passenger compartment to hold the occupant.

Figure 2:
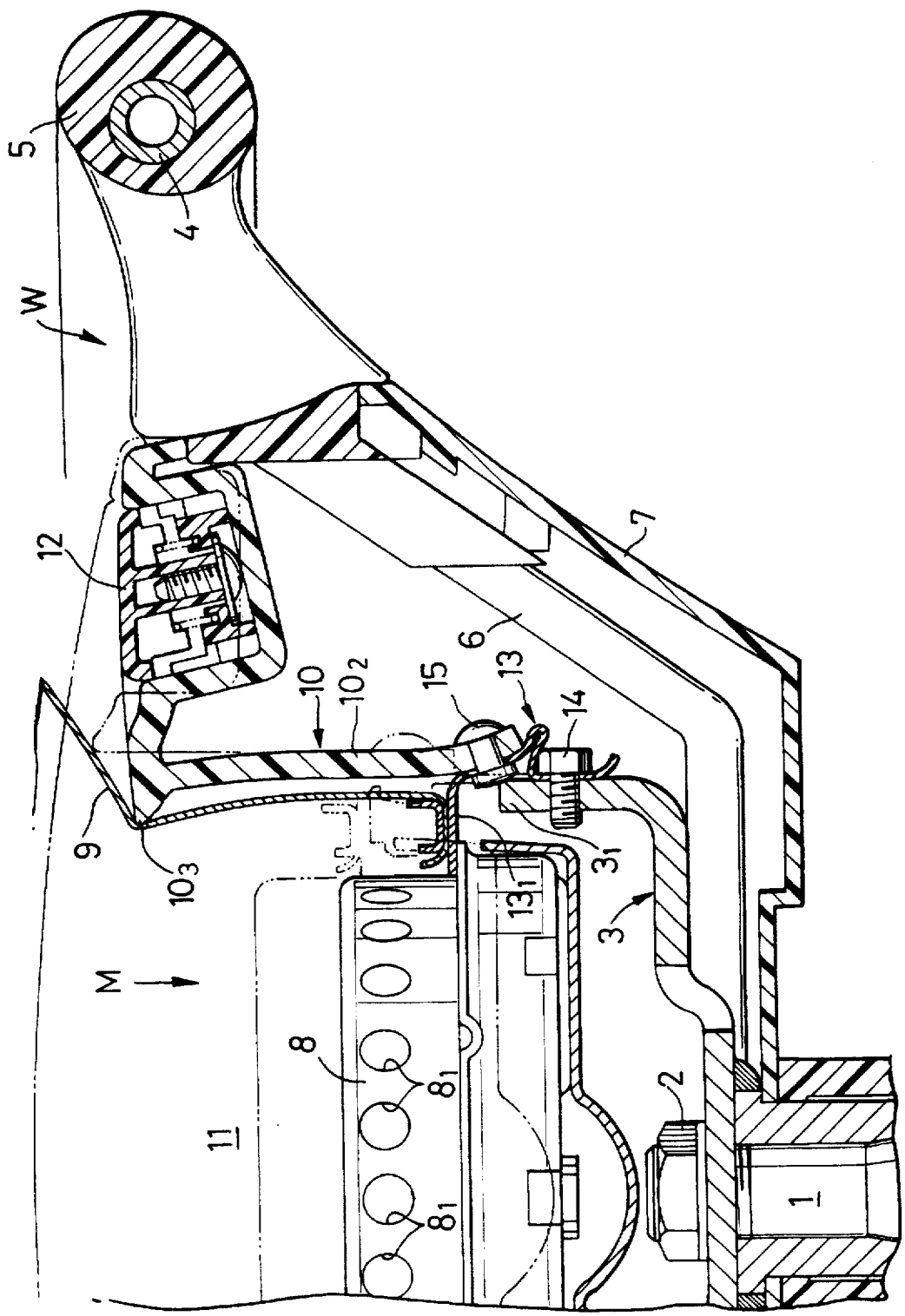
FIG. 2 is an illustration for explaining the operation of the airbag system of the invention.

When the developing airbag contacts the occupant, a load in a direction opposite from the developing direction of the airbag 9 is applied to the airbag module M. As a result, the connection members 13 connecting the side walls $10_2$ of the front steering cover 10 of the airbag module M and the arms $3_1$ of the steering boss 3 collapse and are bent, as shown in FIG. 2, so that the airbag module M is moved from a position shown by chain lines to a position shown by solid lines in the drawing.

In this manner, at the time of development of the airbag 9, the airbag module M is moved in the opposite direction from the developing direction of the airbag 9 while plastically deforming the connection members 13. Therefore, energy of the secondary collision applied from the occupant to the airbag 9 is effectively absorbed to softly hold the occupant by the airbag 9.

Figure 3:
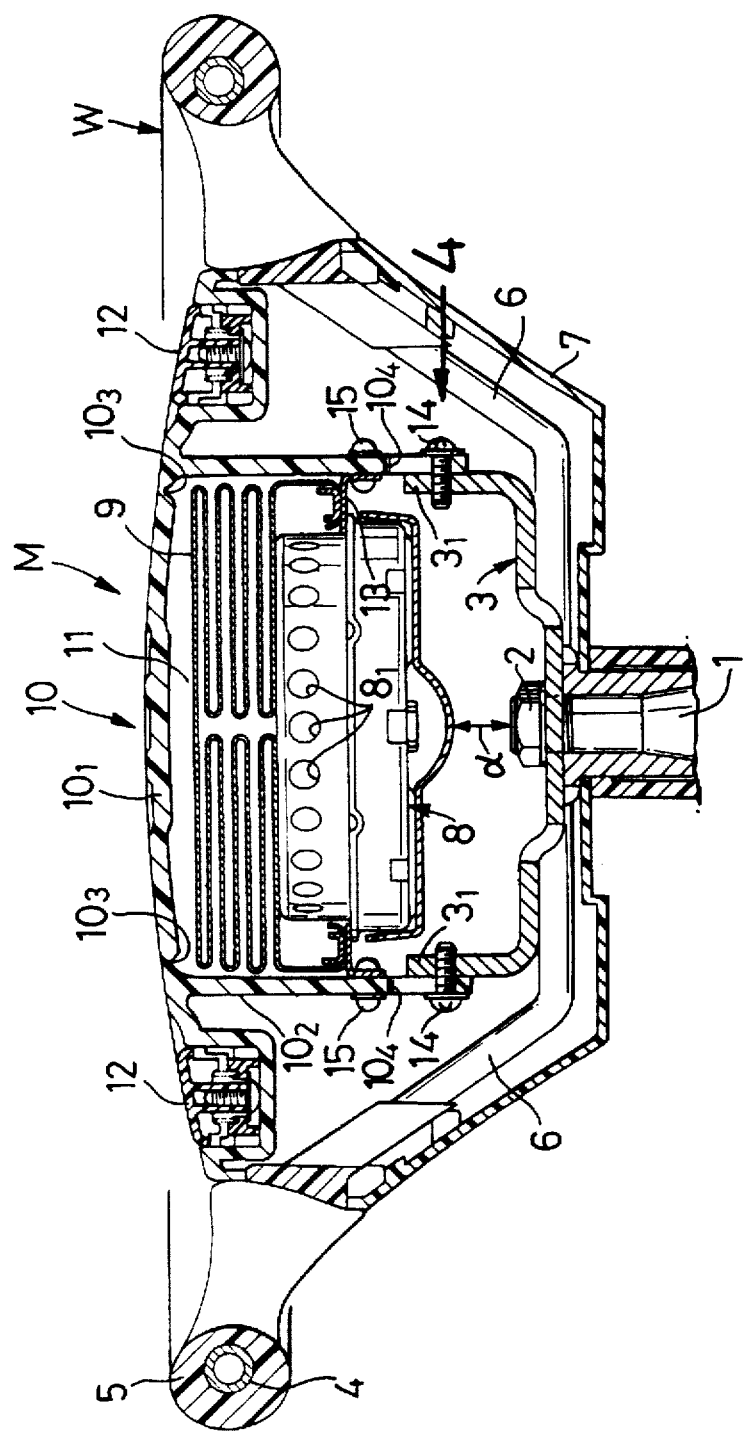
FIG. 3 is a sectional view of an airbag system according to a second embodiment of the invention.
Figure 4:
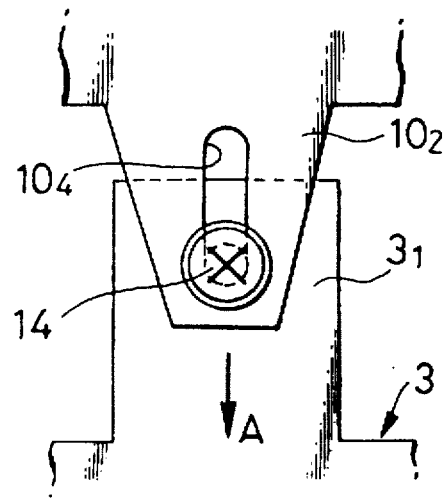
FIG. 4 is an enlarged view taken along an arrow 4 in FIG. 3.

FIGS. 3 and 4 show a second embodiment, wherein FIG. 3 is a sectional view of an airbag, and FIG. 4 is an enlarged view taken along arrow 4 in FIG. 3.

According to the second embodiment, a plurality of elongated holes $10_4$ are formed in the side walls $10_2$ of the front steering cover 10 of the airbag module M. Bolts 14, as fastening means, are passed through the elongated holes $10_4$. By threadedly inserting the bolts 14 into the arms $3_1$ of the steering boss 3, the side walls $10_2$ of the front steering cover 10 and the arms $3_1$ of the steering boss are contacted with each other under pressure. The inflator 8 of the airbag module M is supported by the connection members 13 secured to the side walls $10_2$ of the front steering cover 10 by rivets 15. Other structure of the second embodiment is the same as that of the first embodiment.

When the airbag 9 develops and a load is applied to the airbag module M by a reaction force received from the occupant, the side walls $10_2$ of the front steering cover 10 slide in a direction shown by arrow A in FIG. 4 within a range of the elongated holes $10_4$ against a frictional force applied between the side walls $10_2$ of the front steering cover 10 and the arms $3_1$ of the steering boss 3. With this operation, it is possible to effectively absorb energy of the secondary collision which the airbag 9 receives from the occupant, and to softly hold the occupant.

Figure 5:
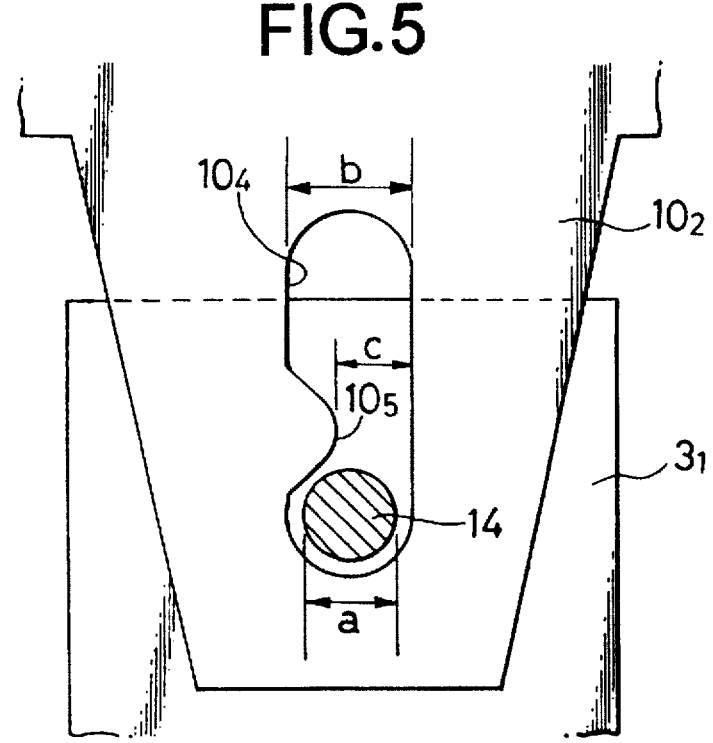
FIG. 5 is a view corresponding to FIG. 4, but illustrating a third embodiment of the invention.

Next, a third embodiment of the invention will be explained with reference to FIG. 5.

According to the third embodiment, a front steering cover 10 is made of synthetic resin and includes side walls $10_2$ each provided with an elongated hole $10_4$. The elongated hole $10_4$ is formed on one side with a protrusion $10_5$. Each of the side walls $10_2$ and the arms $3_1$ are loosely connected with each other by a bolt 14 as a guiding means passing through the elongated hole $10_4$. A diameter a of the bolt 14, a width b of the elongated hole $10_4$, and a width c of the elongated hole at a tip end of the protrusion $10_5$ are set such that a relationship of c<a<b is satisfied.

When the airbag 9 develops and a load is applied to the airbag module M by a reaction force received from the occupant, the side wall $10_2$ of the front steering cover 10 and the elongated hole $10_4$ contained therein is moved with respect to the bolt 14. At that time, the protrusion $10_5$ is caused to deform in order to traverse the bolt 14, which makes it possible to effectively absorb energy of the secondary collision to softly hold the occupant.

Figure 6:
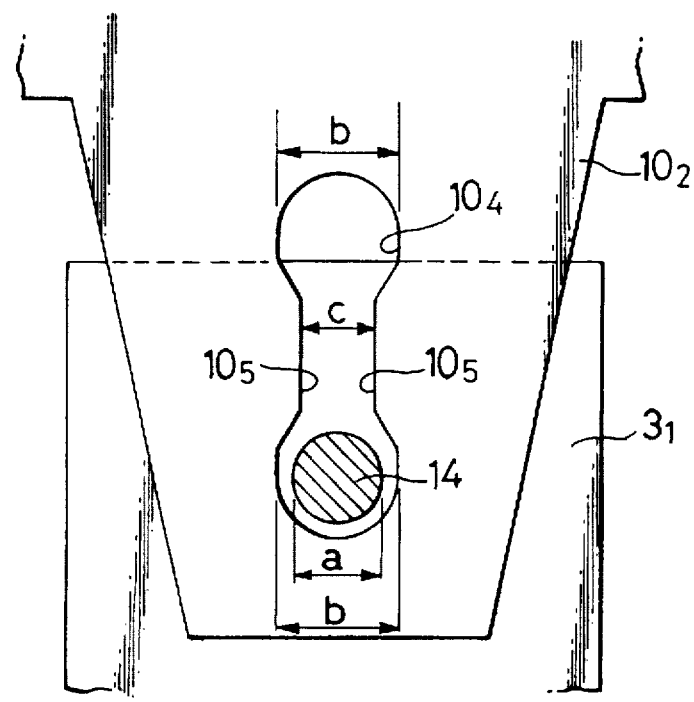
FIG. 6 is a view illustrating a modification of the third embodiment.
Figure 7:
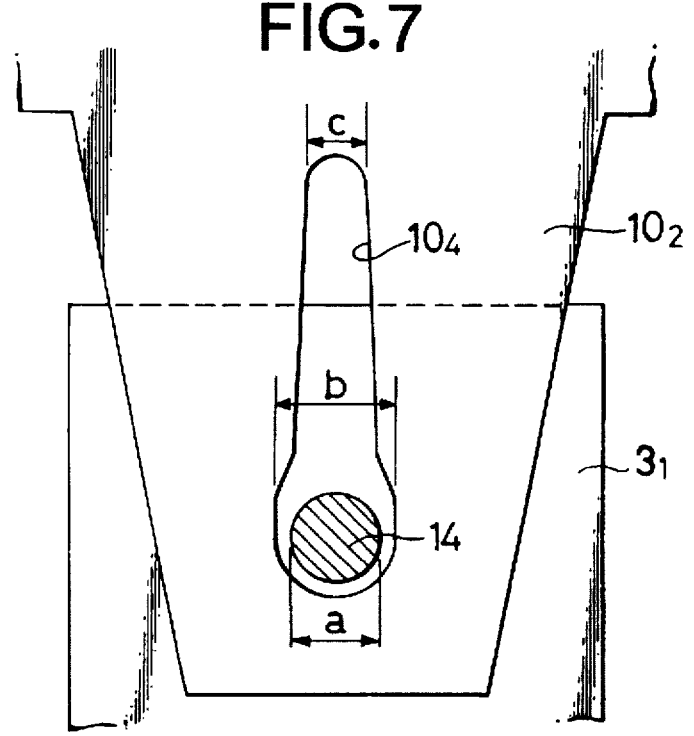
FIG. 7 is a view illustrating another modification of the third embodiment.
Figure 8:
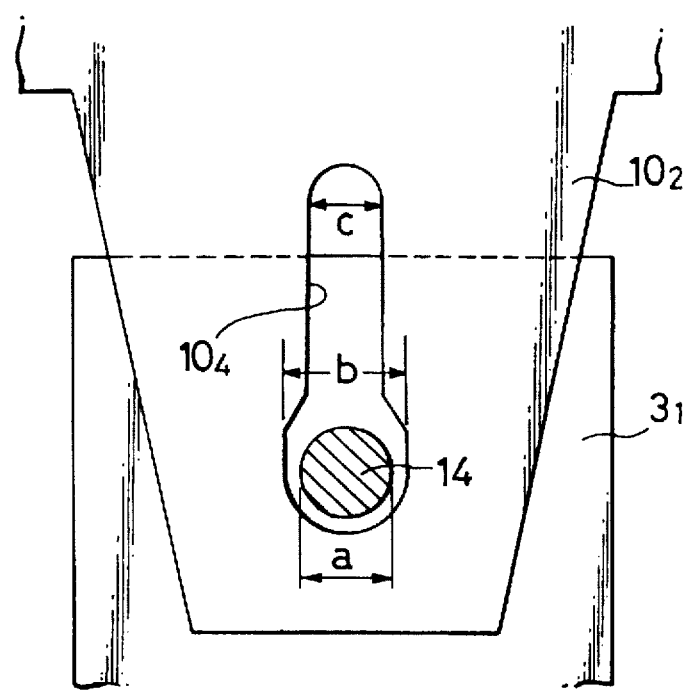
FIG. 8 is a view illustrating still another modification of the third embodiment.

FIGS. 6 to 8 show modifications of the third embodiment. In the modification shown in FIG. 6, the elongated hole $10_4$ is formed on its opposite sides with protrusions $10_5$ and $10_5$. In the modification shown in FIG. 7, the elongated hole $10_4$ is tapered, except for a portion thereof corresponding to the bolt 14. And in the modification shown in FIG. 8, the elongated hole $10_4$ is formed of reduced width, except for that portion thereof corresponding to the bolt 14. According to each of these modifications, the relationship c<a<b prevails, as explained above in connection with the embodiments of FIG. 5, and the reduced width portion of the side of the elongated hole $10_4$ deforms as the airbag module M moves, which makes it possible to effectively absorb energy of the secondary collision in the same manner as that of the third embodiment shown in FIG. 5.

Next, a fourth embodiment of the invention will be described with reference to FIG. 9.

In the fourth embodiment, an outer wall $10_6$ of the front steering cover 10 of the airbag module M and an outer wall $7_1$ of the rear steering cover 7 secured to the steering boss 3 are engaged with each other in a concavo-convex manner. And bolts 14 passing through elongated holes $10_4$ formed in the side walls $10_3$ of the from steering cover 10 am loosely threadedly inserted in the arms $3_1$ of the steering boss 3. The thickness and material of each of the rear and front steering covers 7 and 10 are selected such that the rigidity of the front steering cover 10 is greater than that of the rear steering cover 7.

Figure 9:
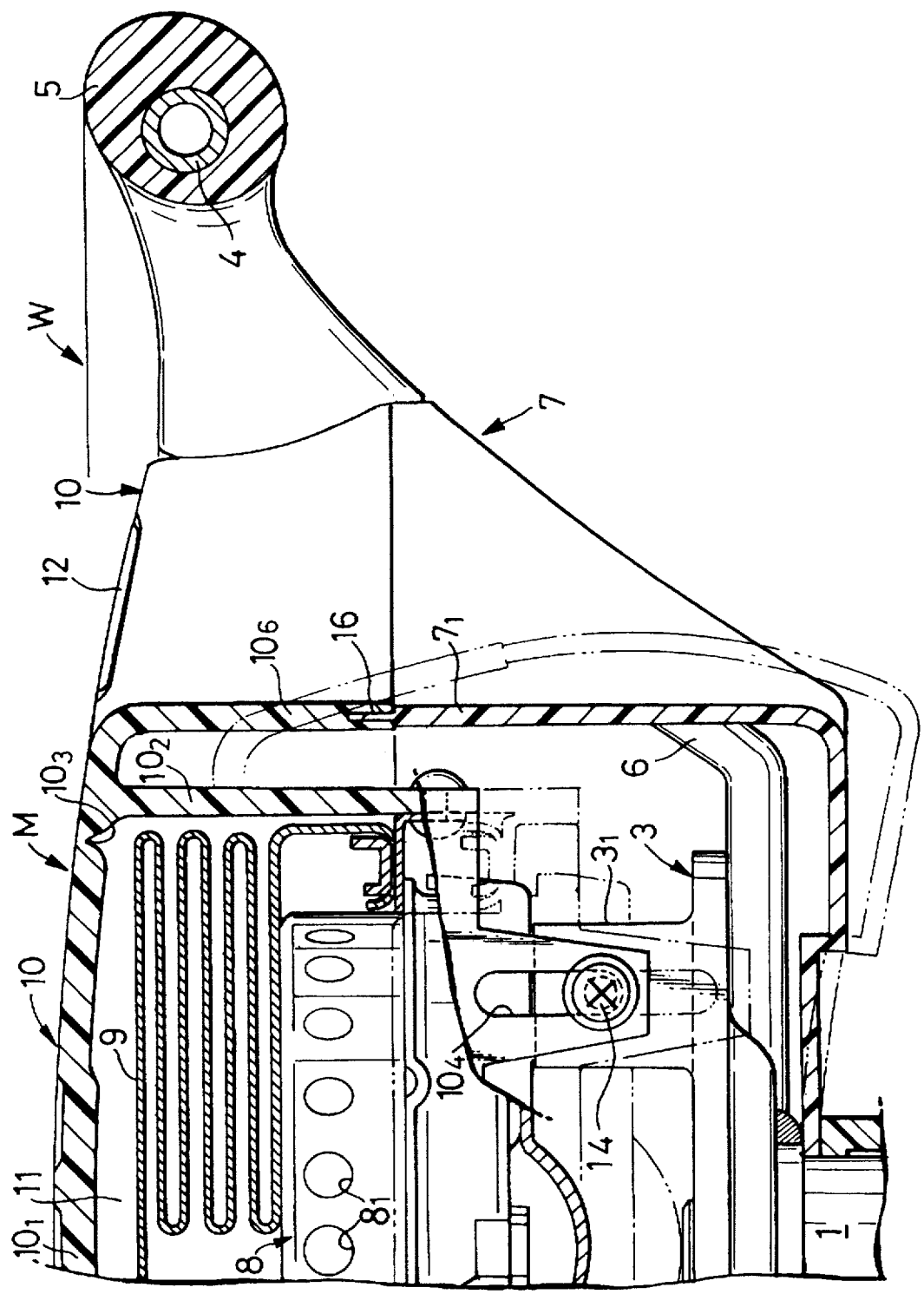
FIG. 9 is a sectional view of an airbag system according to a fourth embodiment of the invention.

According to the fourth embodiment, when the airbag 9 develops and the airbag module M is guided by the elongated holes $10_4$ and the bolts 14 and moved oppositely of the movement of the airbag, the outer wall $10_6$ of the front steering cover 10 pushes the outer wall $7_1$ of the rear steering cover 7, and the rear steering cover 7 having a low rigidity is deformed or fractured, as shown by chain line in FIG. 9, thereby absorbing energy of the secondary collision.

Although the embodiments of the present invention have been described in detail, it will be understood that the present invention is not limited to the above-described embodiments, and various modifications in design may be made without departing from the spirit and scope of the invention defined in claims.

For example, although the elongated hole $10_4$ is provided at the side of the front steering cover 10 in the described embodiments, the elongated hole can be provided at the side of the steering boss 3. Instead of using the bolt 14 as the fastening means, other equivalent devices, such as a rivet, may be used. Further, instead of using the bolt 14 as the guiding means, other equivalent devices, such as a rivet or a pin, may be used.

What is claimed is:

1. In an airbag system including an airbag module provided at a central portion of a steering wheel having a steering shaft, said airbag module including an airbag and an inflator for supplying a high pressure gas to said airbag, whereby said airbag is developed into a passenger compartment by the high pressure gas generated by said inflator for holding an occupant in a vehicle when a deceleration greater than a predetermined value is detected means for movably supporting said airbag module, comprising: a steering boss secured to said steering shaft so as to move in an opposite direction from a developing direction of said airbag, and means supporting said airbag module with respect to said steering boss, said supporting means including means for absorbing energy of a secondary collision between said airbag and said occupant, wherein said supporting means comprises an elongated hole formed in at least one of said steering boss and said airbag module, a fastening means passing through said elongated hole to fasten said steering boss and said airbag module, and means for developing a predetermined frictional resistance between surfaces of said steering boss and said airbag module during relative movement therebetween.

2. In an airbag system including an airbag module provided at a central portion of a steering wheel having a steering shaft, said airbag module including an airbag and an inflator for supplying a high pressure gas to said airbag, whereby said airbag is developed into a passenger compartment by the high pressure gas generated by said inflator for holding an occupant in a vehicle when a deceleration greater than a predetermined value is detected means for movably supporting said airbag module, comprising: a steering boss secured to said steering shaft so as to move in an opposite direction from a developing direction of said airbag, and means supporting said airbag module with respect to said steering boss, said supporting means including means for absorbing energy of a secondary collision between said airbag and said occupant, wherein said supporting means comprises an elongated hole formed in at least one of said steering boss and said airbag module, a guide means passing through said elongated hole for guiding said airbag module for movement with respect to said steering boss, said elongated hole having a narrow portion of a width smaller than a diameter of said guide means operative to absorb energy of a secondary collision when said guide means traverses said narrow portion.

* * * * *